(12) United States Patent
Okada

(10) Patent No.: US 7,557,354 B2
(45) Date of Patent: Jul. 7, 2009

(54) RADIATION IMAGE DETECTOR

(75) Inventor: Yoshihiro Okada, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/871,229

(22) Filed: Oct. 12, 2007

(65) Prior Publication Data

US 2008/0087834 A1    Apr. 17, 2008

(30) Foreign Application Priority Data

Oct. 12, 2006 (JP) ............................. 2006-278296

(51) Int. Cl.
*G01T 1/24* (2006.01)
(52) U.S. Cl. ............................................... 250/370.08
(58) Field of Classification Search ............ 250/370.08, 250/370.09, 370.11
See application file for complete search history.

(56) References Cited

U.S. PATENT DOCUMENTS

| 5,099,128 | A | * | 3/1992 | Stettner | ................. | 250/370.11 |
| 6,163,029 | A | * | 12/2000 | Yamada et al. | ......... | 250/370.09 |
| 6,593,577 | B2 | | 7/2003 | Izumi | | |
| 2002/0130266 | A1 | * | 9/2002 | Kyyhkynen | ............ | 250/370.09 |

* cited by examiner

*Primary Examiner*—David P Porta
*Assistant Examiner*—Mark R Gaworecki
(74) *Attorney, Agent, or Firm*—Sughrue Mion, PLLC

(57) ABSTRACT

A radiation image detector including: a plurality of image sensing sections, disposed on a substrate in an array, for converting radiation to electrical signals; a plurality of data lines for transferring electrical signals converted by the image sensing sections; a charge amplifier circuit for integrating electrical signals transferred by the data lines; and a selector circuit for connecting a plurality of data lines to the charge amplifier circuit by sequentially switching the data lines.

5 Claims, 6 Drawing Sheets

RADIATION IMAGE DETECTOR

BACKGROUND OF THE INVENTION

1. Field of the Invention

The present invention relates to a radiation image detector in which electrical signals converted by a plurality of image sensing sections arranged in an array are transferred through data lines and integrated by a charge amplifier circuit.

2. Description of the Related Art

Recently, flat panel detectors (FPDs) have been put into practical use. FPD includes an X-ray sensitive layer on a TFT active matrix array and is capable of directly converting X-ray information to digital data. It has advantages over conventional imaging plates in that it allows instantaneous image verification and checking for motion images, and is spreading rapidly.

In a conventional radiation image detector, a semiconductor layer which is conductive for electromagnetic waves is formed on an active matrix substrate having collection electrodes disposed in an array, and an upper electrode is formed on the semiconductor layer. The upper electrode is connected to a high voltage power source. The semiconductor film is a selenium-based amorphous a-Se film with a thickness of 100 to 1000 μm, and generates charges inside of the film when exposed to X-rays.

An equivalent circuit diagram of a conventional radiation image detector is illustrated in FIG. 5.

As illustrated in FIG. 5, a TFT switch 3 and a storage capacitor 2 are provided adjacent to each of collection electrodes disposed on the active matrix substrate in an array. A scanning line 4 is connected to the gate electrode of the TFT switch 3, and a data line 5 is connected to the source electrode. The scanning line 4 is connected to a gate driver IC 40, and the data line 5 is connected to a charge amplifier IC 35 which includes therein a charge amplifier circuit.

A plan view of the conventional radiation image detector is shown in FIG. 6.

An active matrix substrate 10 is formed on a glass substrate 70, and gate driver ICs 40 and charge amplifier ICs 35 are connected to the glass substrate 70 through TCPs 45 and TCPs 36 respectively. Each of the TCPs 36 is connected to a data processing substrate 80 which includes an A/D converter circuit 60 and a control IC 80, and each of the TCPs 45 is connected to a gate substrate 46.

Here, the terminal connection area of the TCP is formed of a film material and influenced largely by linear expansion effects, thus it is said that the arrangement pitch of the wires is limited to 70 μm in a common structure. On the other hand, recent trend in the radiation image detectors is toward a finer pixel pitch, and a pitch of less than 70 μm is demanded.

Making the pixel pitch of the radiation image detector less than 70 μm, however, poses a problem that the TCPs are unable to be mounted in the range of the active matrix substrate of the radiation image detector, since the line pitch in the terminal connection area of the TCP is limited to 70 μm. A larger glass substrate may accommodate the TCPs, but the use of such a large radiation image detector is not practical.

In view of the circumstances described above, it is an object of the present invention to provide a radiation image detector with a pixel pitch of around 50 μm without increasing the size of the detector.

SUMMARY OF THE INVENTION

The radiation image detector of the present invention is a radiation image detector including: a plurality of image sensing sections, disposed on a substrate in an array, for converting radiation to electrical signals; a plurality of data lines for transferring electrical signals converted by the image sensing sections; a charge amplifier circuit for integrating electrical signals transferred by the data lines; and a selector circuit for connecting a plurality of data lines to the charge amplifier circuit by sequentially switching the data lines.

In the radiation image detector of the present invention, the selector circuit may be formed on an IC chip and the IC chip may be mounted on the substrate.

Further, the charge amplifier circuit and selector circuit may be formed on different IC chips with each other.

According to the radiation image detector of the present invention, which includes a plurality of image sensing sections, disposed on a substrate in an array, for converting radiation to electrical signals; a plurality of data lines for transferring electrical signals converted by the image sensing sections; and a charge amplifier circuit for integrating electrical signals transferred by the data lines, a selector circuit is provided for connecting a plurality of data lines to the charge amplifier by sequentially switching the data lines. This allows the line pitch of the data lines to be made finer than the pitch of the connection terminals of the charge amplifier, so that a high resolution pixel pitch of around 50 μm may be realized without increasing the size of the detector.

DESCRIPTION OF THE PREFERRED EMBODIMENTS

Hereinafter, an embodiment of the radiation image detector of the present invention will be described with reference to the accompanying drawings.

A flat panel image sensor, as the radiation image detector of the present embodiment, is an image sensor capable of detecting an image represented by X-rays or the like, and is used, for example, in X-ray imaging equipment that creates a picture of an X-ray image transmitted through a human body or the like. It is noted that the radiation image detector of the present invention is not necessarily limited to the flat panel type, and includes an image sensor with a curved surface substrate.

Figure 2:
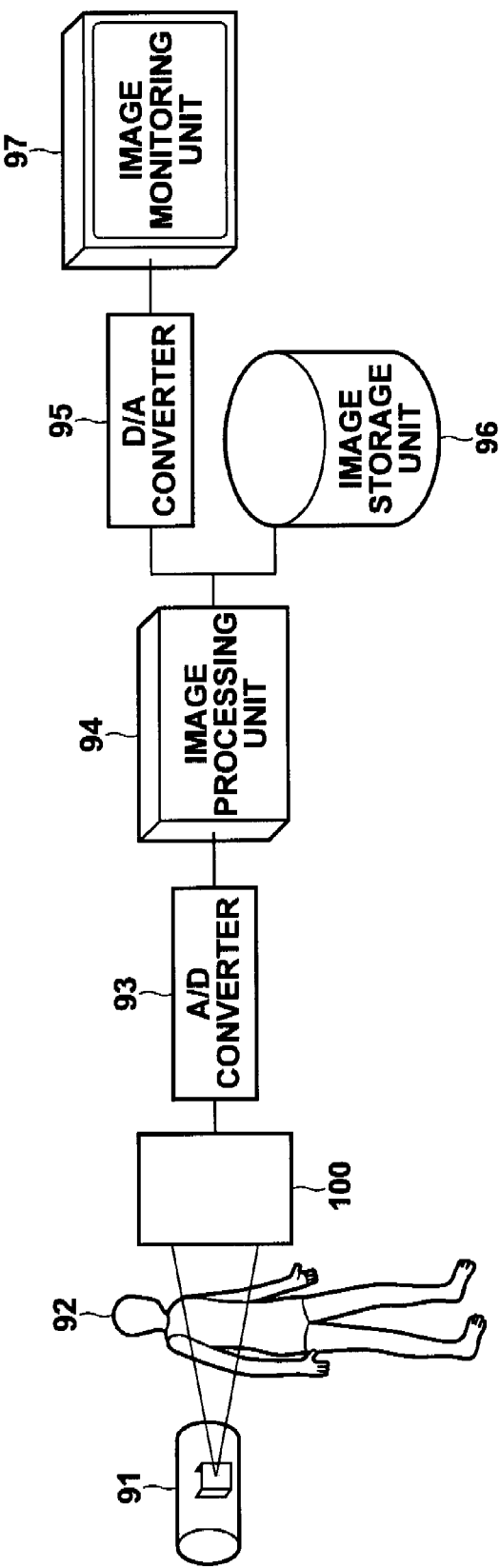
FIG. 2 illustrates an example application of the radiation image detector of the present invention.

That is, for example, an X-ray transmission image of a subject 92 formed by X-rays outputted from an X-ray tube 91 is converted to image signals by a radiation image detector 100 of the present embodiment, in which photoelectric conversion elements are disposed in a two dimensional array, as illustrated in FIG. 2.

Analog image signals outputted from the radiation image detector 100 are converted to digital image signals through an A/D converter 93, and inputted to an image processing unit 94. The image processing unit 94 causes an image storage unit 96 to store an image to be preserved, as well as performing various types of image processing. Digital image signals outputted from the image processing unit 94 are converted to analog image signals through a D/A converter 95 and may be displayed on the screen of an image monitoring unit 97.

Figure 1:
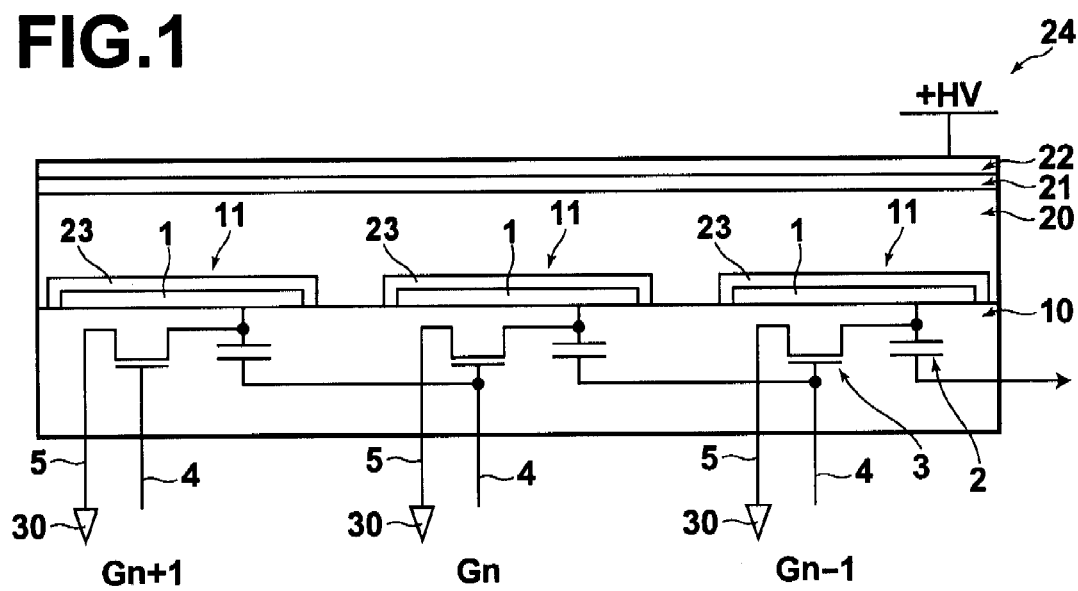
FIG. 1 is a schematic configuration diagram of the radiation image detector according to an embodiment of the present invention.

FIG. 1 illustrates a schematic configuration of the radiation image detector 100 according to the present embodiment.

The radiation image detector 100 according to the present embodiment includes an active matrix substrate 10, a semiconductor film 20 formed on substantially the entire surface of the active matrix substrate 10, a dielectric layer 21, an upper electrode 22, and an electron blocking layer 23 provided on a collection electrode 1 to be describe later, as illustrated in FIG. 1.

The semiconductor film 20 has conductivity for electromagnetic waves, and generates charges inside of the film when exposed to X-rays. As for the semiconductor film 20, for example, a selenium-based amorphous a-Se film with a thickness of 100 to 1000 μm may be used. The semiconductor film 20 is formed with a thickness of, for example, 300 to 1000 μm by a vacuum deposition method.

The dielectric layer 21 and electron blocking layer 23 are for preventing charges from being stored in a storage capacitor 2, to be described later, caused by leak currents when X-rays are irradiated, and provided as required.

That is, the dielectric layer 21 prevents charges from entering into the semiconductor film 20 from the upper electrode 22 when an operation voltage is applied to the upper electrode 22, while the electron blocking layer 23 prevents charges from entering into the semiconductor film 20 from the collection electrode 1. This may improve the resolution of an X-ray image by preventing leak currents.

The upper electrode 22 is formed of a low resistance conductive material, such as Au, Al or the like, and connected to a high voltage power source 24.

The active matrix substrate 10 includes: multitudes of pixels, each having a collection electrode 1 for collecting charges generated in the semiconductor film 20, a storage capacitor 2 for storing charges collected by the collection electrode 1, and a TFT switch 3 for reading out charges stored in the storage capacitor 2; multitudes of scanning lines 4 for switching ON and OFF the TFT switches 3; and multitudes of data lines 5 through which charges stored in the storage capacitors 2 are read out. The pixels 11 are disposed in an array.

As for the TFT switch 3, an a-Si TFT using amorphous silicon in the active layer is generally used. A scanning line 4 for switching ON/OFF the TFT switch 3 is connected to the gate electrode of the TFT switch 3, and a data line 5, through which charges stored in the storage capacitor 2 are read out, is connected to the source electrode. A charge amplifier 30 is connected to the end of the data line 5.

Figure 3:
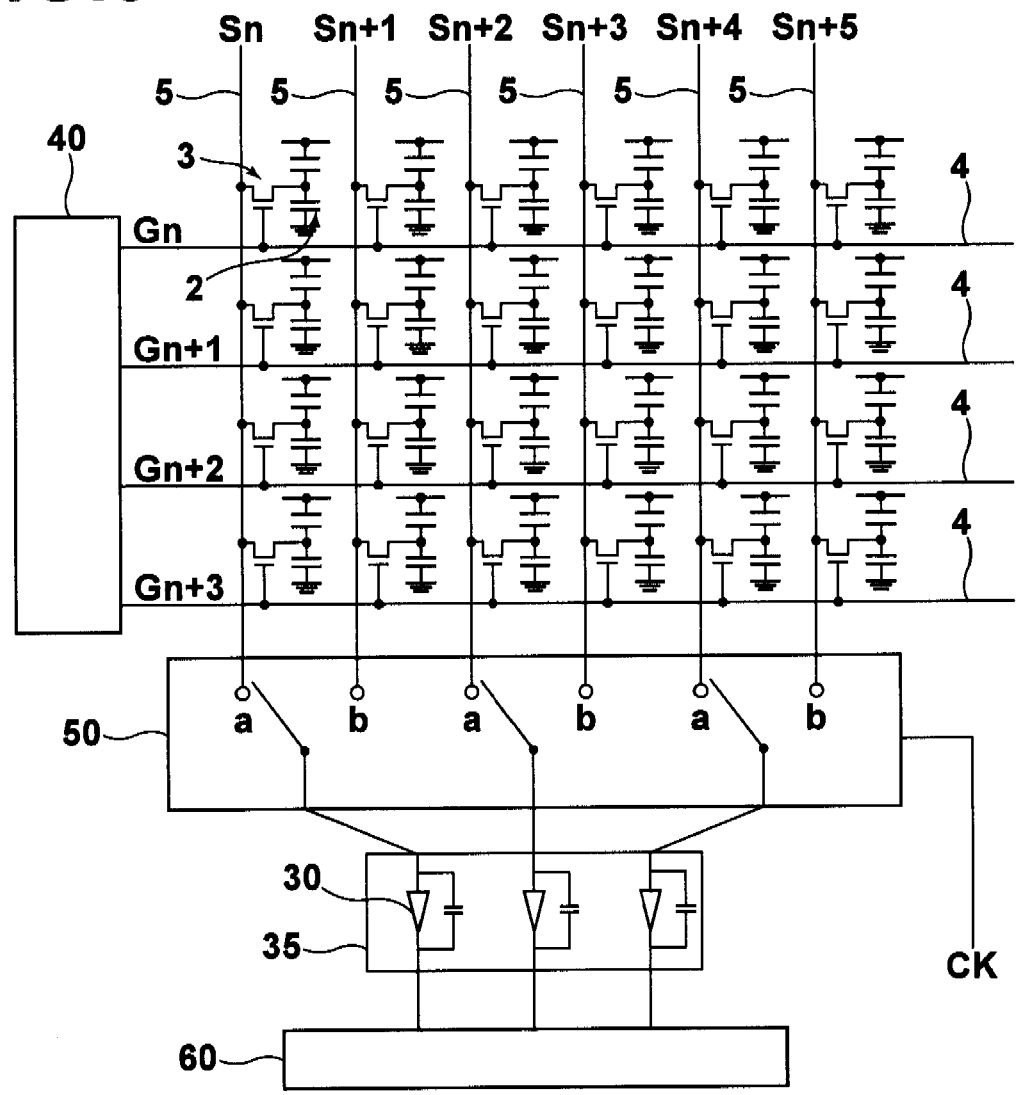
FIG. 3 is an equivalent circuit diagram of pixels of the radiation image detector according to an embodiment of the present invention.

The equivalent circuit diagram of the radiation image detector according to the present embodiment is shown in FIG. 3.

As illustrated in FIG. 3, a plurality of scanning lines 1 is disposed in the horizontal direction of FIG. 3, and a plurality of data lines 5 is disposed in the vertical direction. Each of the scanning lines 4 is connected to a gate driver IC 40 that outputs a control signal for switching ON/OFF the TFT switch 3 to each of the scanning lines 4. Each of the data lines 5 is connected to a selector IC 50, and a charge amplifier IC 35 including a plurality of charge amplifiers 30 is connected to the output side of the selector IC 50. The output side of the charge amplifier IC 35 is connected to an A/D conversion circuit 60.

The selector IC 50 connects a plurality of data lines 5 to each charge amplifier 30 of the charge amplifier IC 35 by sequentially switching them in response to a clock signal CK.

Figure 4:
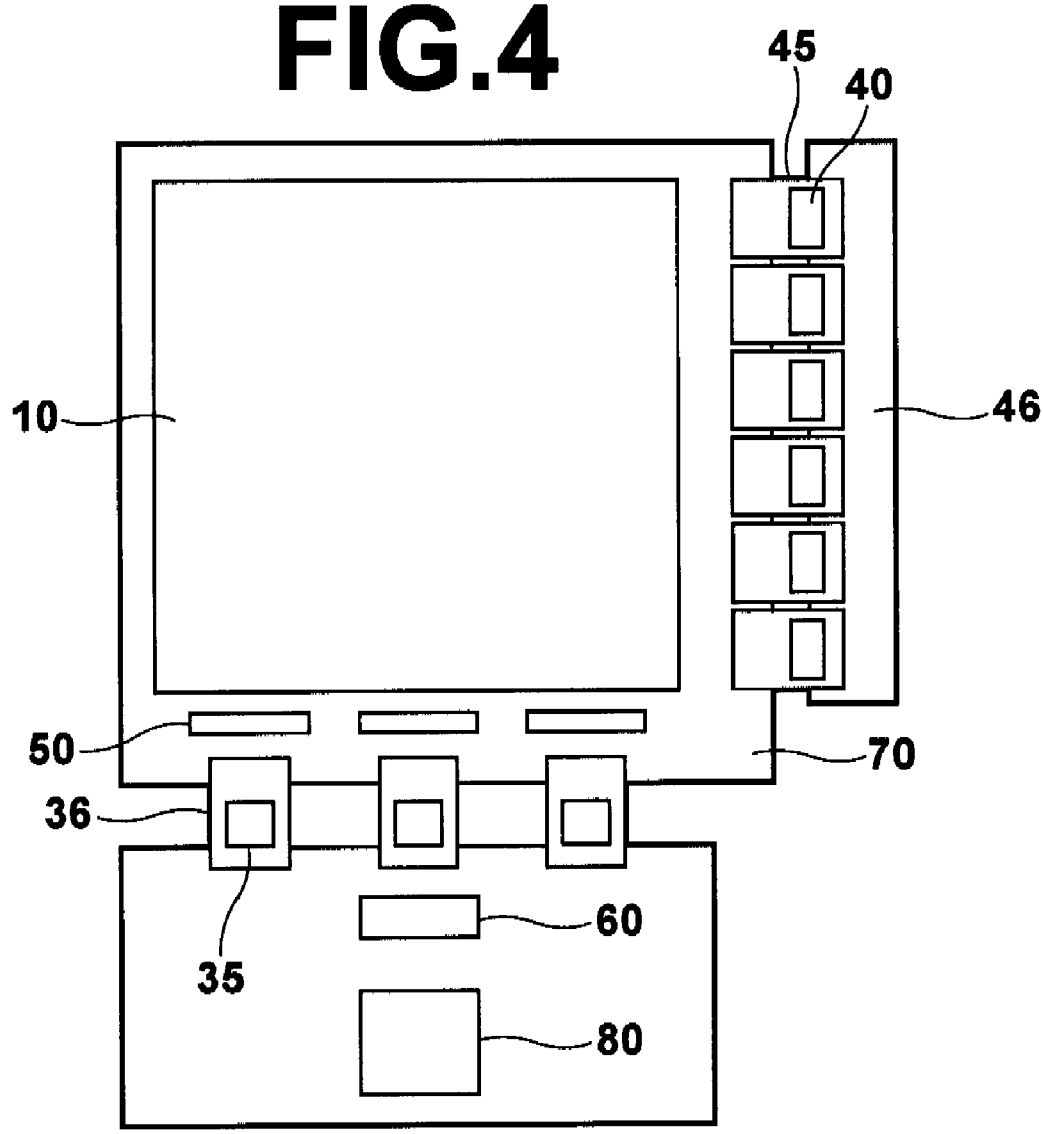
FIG. 4 is a plan view of the radiation image detector according to an embodiment of the present invention, illustrating the configuration thereof.
Figure 5:
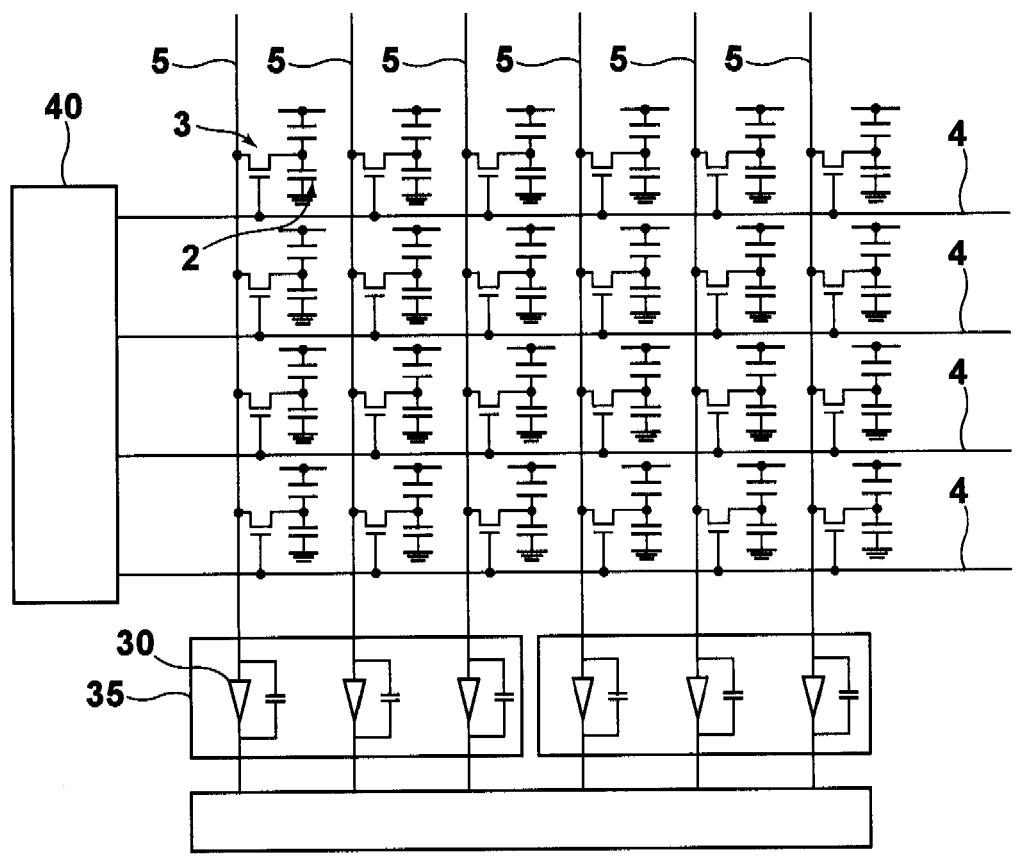
FIG. 5 is an equivalent circuit diagram of a conventional radiation image detector.
Figure 6:
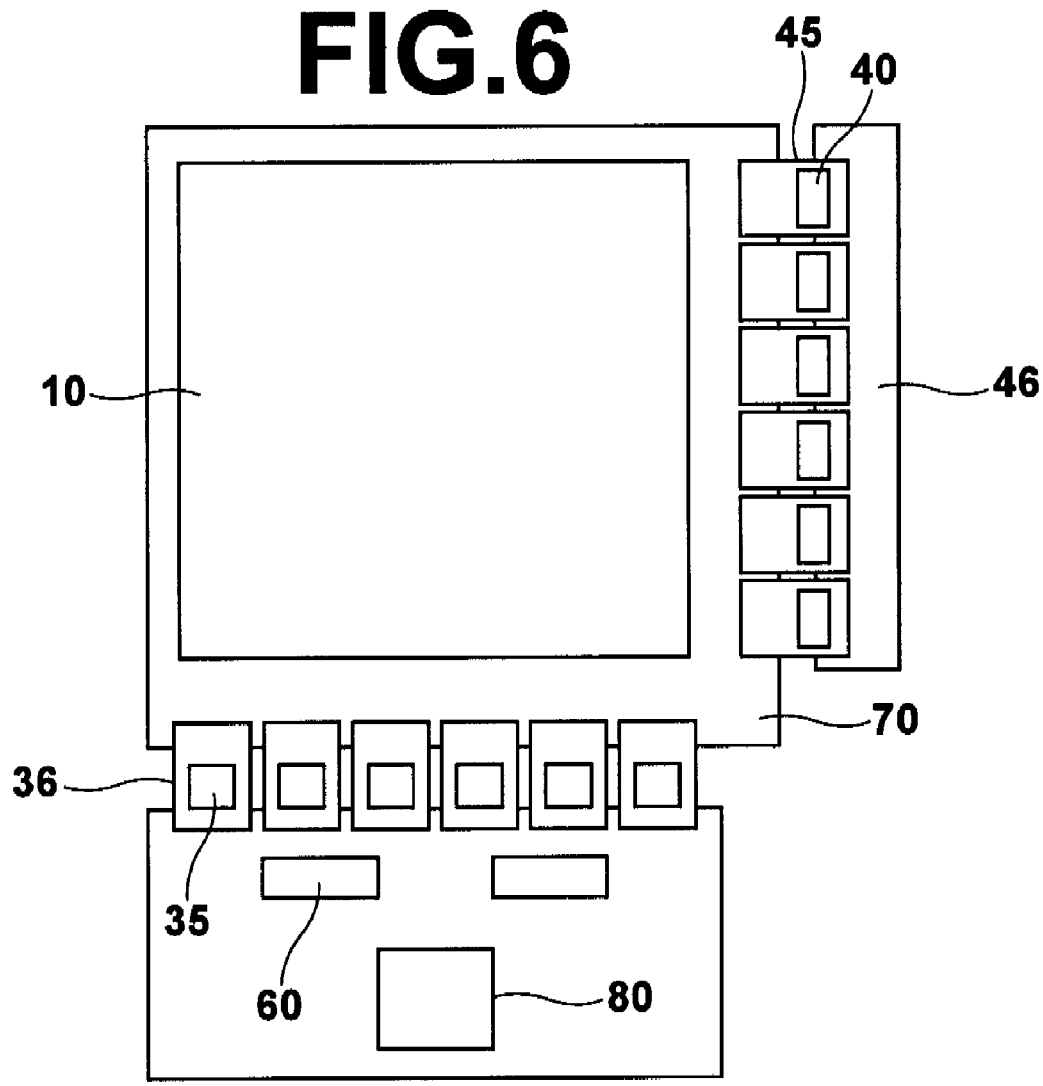
FIG. 6 is a plan view of the conventional radiation image detector, illustrating the configuration thereof.

A plan view illustrating the configuration of the radiation image detector according to the present embodiment is shown in FIG. 4.

As illustrated in FIG. 4, the active matrix substrate 10 of the radiation image detector according to the present embodiment includes pixels 11, scanning lines 4, and data lines 5 formed on a glass substrate 70.

The glass substrate 70 also includes selector ICs 50, each of which is an IC chip with a selector circuit formed thereon. That is, each of the selector ICs 50 is mounted by the Chip On Glass (COG) technique.

TCPs 36, each having the charge amplifier IC 35 mounted thereon, are connected to one side of the glass substrate 70. A data processing substrate 85 which includes an A/D converter circuit 60 and a control IC 80 is connected to the TCPs 36. The control IC 80 controls the operation of the radiation image detector.

Further, multitudes of TCPs 45, each having the gate driver IC 45 mounted thereon, are connected to another side of the glass substrate 70. A gate substrate 46 is connected to the TCPs 45.

Next, the operational principle of the radiation image detector according to the present embodiment will be described.

When x-rays transmitted through a subject are irradiated from above in FIG. 1, the semiconductor film 20 generates charges inside thereof. Holes of the charges generated in the semiconductor film 20 are collected to each collection electrode 1 due to a bias between the upper electrode 22 and collection electrode 1, and stored in the storage capacitor 2 electrically connected to the collection electrode 1. The semiconductor film 20 generates different amounts of charges depending on the X-ray dosage, so that an amount of charges depending on image information represented by the X-rays is stored in the storage capacitor 2 of each pixel 11.

Thereafter, a signal for switching ON each TFT 3 is sequentially applied through each scanning line 4, and charges stored in each storage capacitor 2 are read out through each data line 5. Then, the amount of charges of each pixel 11 is detected by each amplifier 30, thereby the image information is read out.

The method for driving the radiation image detector according to the present embodiment will be described with reference to the equivalent circuit diagram of FIG. 3.

First, X-ray image data are recorded in the radiation image detector by irradiating X-rays as described above. Charges generated in the semiconductor film 20 according to the X-ray dosage are collected by each collection electrode 1 and stored in the storage capacitor 2 electrically connected to the collection electrode 1. Then, an ON signal is sequentially inputted to the scanning lines 4 in the order of Gn, Gn+1, Gn+2, - - - from the gate driver IC 40.

Then, each a-terminal of the selector circuit of the selector IC 50 is connected to each charge amplifier 30, and an electrical signal flowing out from each data line 5 connected to each a-terminal is detected by each charge amplifier 30. Thereafter, the analog image signal detected by the charge amplifier 30 is converted to a digital image signal through the A/D conversion circuit 60 and outputted therefrom.

Then, the selector circuit of the selector IC 50 is switched from a-terminals to b-terminals in response to the CK signal, so that each b-terminal is connected to each charge amplifier 30, and an electrical signal flowing out from each data line 5 connected to each b-terminal is detected by each charge amplifier 30. Thereafter, the analog image signal detected by the charge amplifier 30 is converted to a digital image signal through the A/D conversion circuit 60 and outputted therefrom.

In the radiation image detector according to the present embodiment, two data lines 5 are sequentially switched by the selector IC 50 for a single charge amplifier 30. But the present invention is not limited to this, and three or more data lines 5 may be sequentially switched by the selector IC 50 for a single charge amplifier 30.

What is claimed is:

1. A radiation image detector, comprising:
    a plurality of image sensing sections, disposed on a substrate in an array, for converting radiation to electrical signals;
    a plurality of data lines for transferring the electrical signals converted by the image sensing sections;
    a charge amplifier circuit for integrating the electrical signals converted by the image sensing sections and transferred by the data lines; and
    a selector circuit for sequentially switching the plurality of data lines to connect the plurality of data lines to the charge amplifier circuit.

2. The radiation image detector of claim 1, wherein the selector circuit is formed on an IC chip and the IC chip is mounted on the substrate.

3. The radiation image detector of claim 2, wherein the charge amplifier circuit is formed on a second IC chip that is different from the first IC chip.

4. The radiation image detector of claim 1, wherein the selector circuit is formed on a first IC chip and the charge amplifier circuit is formed on a second IC chip that is different from the first IC chip.

5. The radiation image detector of claim 1, wherein the charge amplifier circuit first integrates the electrical signals converted by the image sensing sections.

* * * * *